(12) United States Patent
Noldus

(10) Patent No.: US 7,865,199 B2
(45) Date of Patent: Jan. 4, 2011

(54) TELECOMMUNICATION SYSTEM AND METHOD FOR TRANSFERRING SMS MESSAGES BETWEEN TERMINALS AND INTELLIGENT NETWORK SERVICES

(75) Inventor: Rogier August Noldus, Goirle (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 753 days.

(21) Appl. No.: 11/722,866

(22) PCT Filed: Dec. 31, 2004

(86) PCT No.: PCT/EP2004/014889

§ 371 (c)(1),
(2), (4) Date: Jun. 26, 2007

(87) PCT Pub. No.: WO2006/069595

PCT Pub. Date: Jul. 6, 2006

(65) Prior Publication Data

US 2008/0132256 A1    Jun. 5, 2008

(51) Int. Cl.
*H04Q 7/20* (2006.01)

(52) U.S. Cl. .......... 455/466; 455/412.1; 455/412.2; 455/414.1; 455/414.2; 455/517

(58) Field of Classification Search .......... 455/466, 455/412.1–412.2, 414.1–414.2, 517
See application file for complete search history.

(56) References Cited

U.S. PATENT DOCUMENTS

| 7,142,876 B2* | 11/2006 | Trossen et al. | 455/456.3 |
| 7,450,936 B2* | 11/2008 | Kim | 455/418 |
| 2002/0123360 A1 | 9/2002 | Vikman et al. | |
| 2003/0211845 A1* | 11/2003 | Lohtia et al. | 455/414.3 |
| 2003/0216147 A1* | 11/2003 | Morin et al. | 455/466 |
| 2004/0198386 A1* | 10/2004 | Dupray | 455/456.1 |
| 2004/0243490 A1* | 12/2004 | Murto et al. | 705/30 |

FOREIGN PATENT DOCUMENTS

| WO | WO 02/07454 A | 1/2002 |
| WO | WO 03/021983 A | 3/2003 |

* cited by examiner

*Primary Examiner*—CongVan Tran

(57) ABSTRACT

A telecommunication system for transferring SMS messages between a first terminal and at least one second terminal or intelligent network service. The system comprises a mobile telecommunication system (5) and one or more mobile network switching nodes (2) acting as gateway between the mobile telecommunication system (5) and the remainder of the telecommunication system for sending and receiving SMS messages to and from mobile terminals (6a-6z), coupled to an Intelligent Network control node (1) and one or more message servers (3). The Intelligent Network control node (1), is coupled to the mobile network switching nodes (2) and the message servers (3) for providing Intelligent Network services in the telecommunication system. One or more message servers (3), routing messages in the telecommunication system are coupled to the Intelligent Network control node (1) and the mobile network switching nodes (2). The Intelligent Network control node (1) and the mobile network switching nodes (2) are adapted to exchange the SMS messages directly (101b). Further there is provided a method for transferring SMS messages in such a telecommunication system, between the Intelligent Network control node (1) and the mobile network switching nodes (2) among others for interactive message sequences.

8 Claims, 12 Drawing Sheets

Application Layer
Transport Layer
Relay Layer
Link Layer

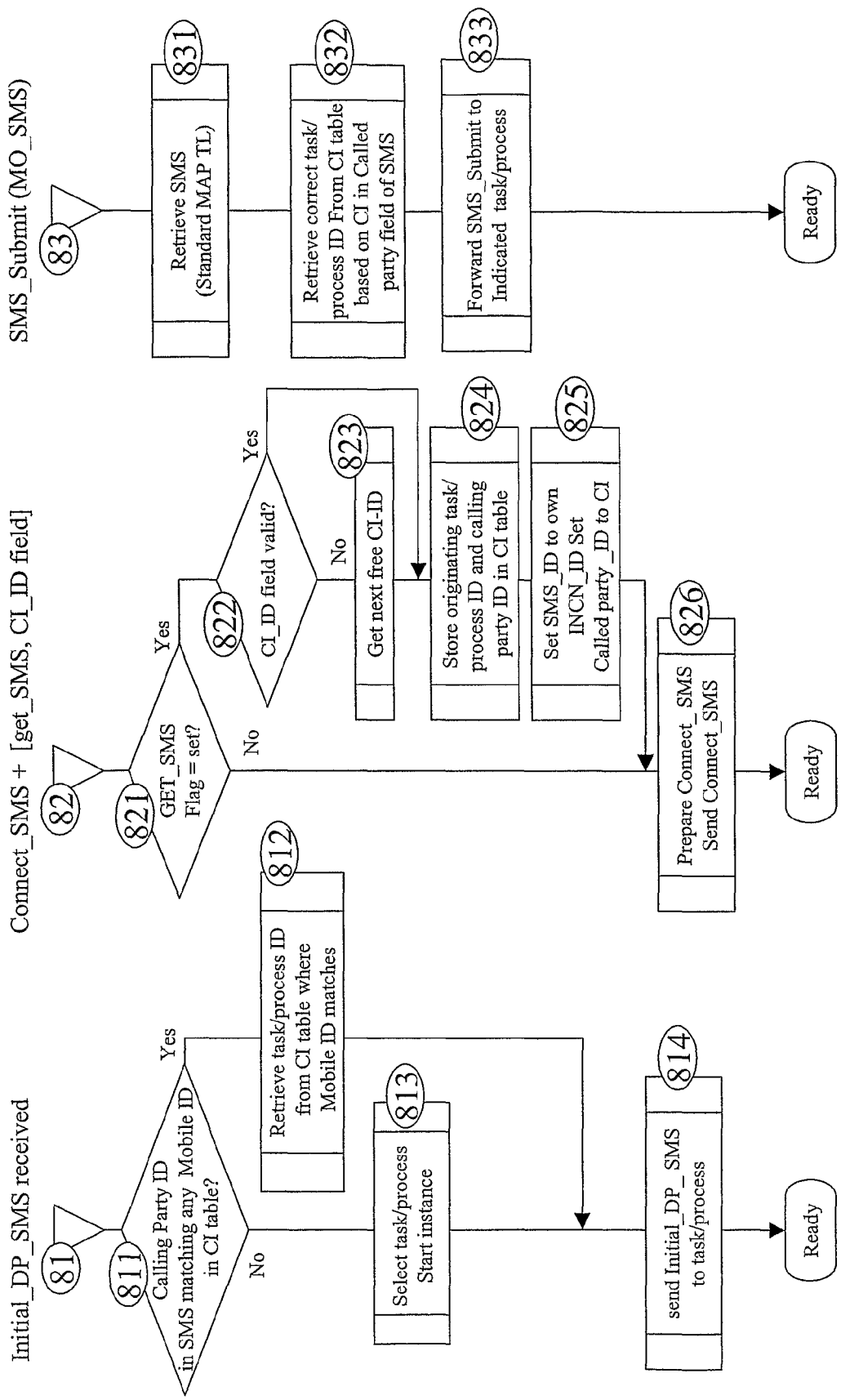

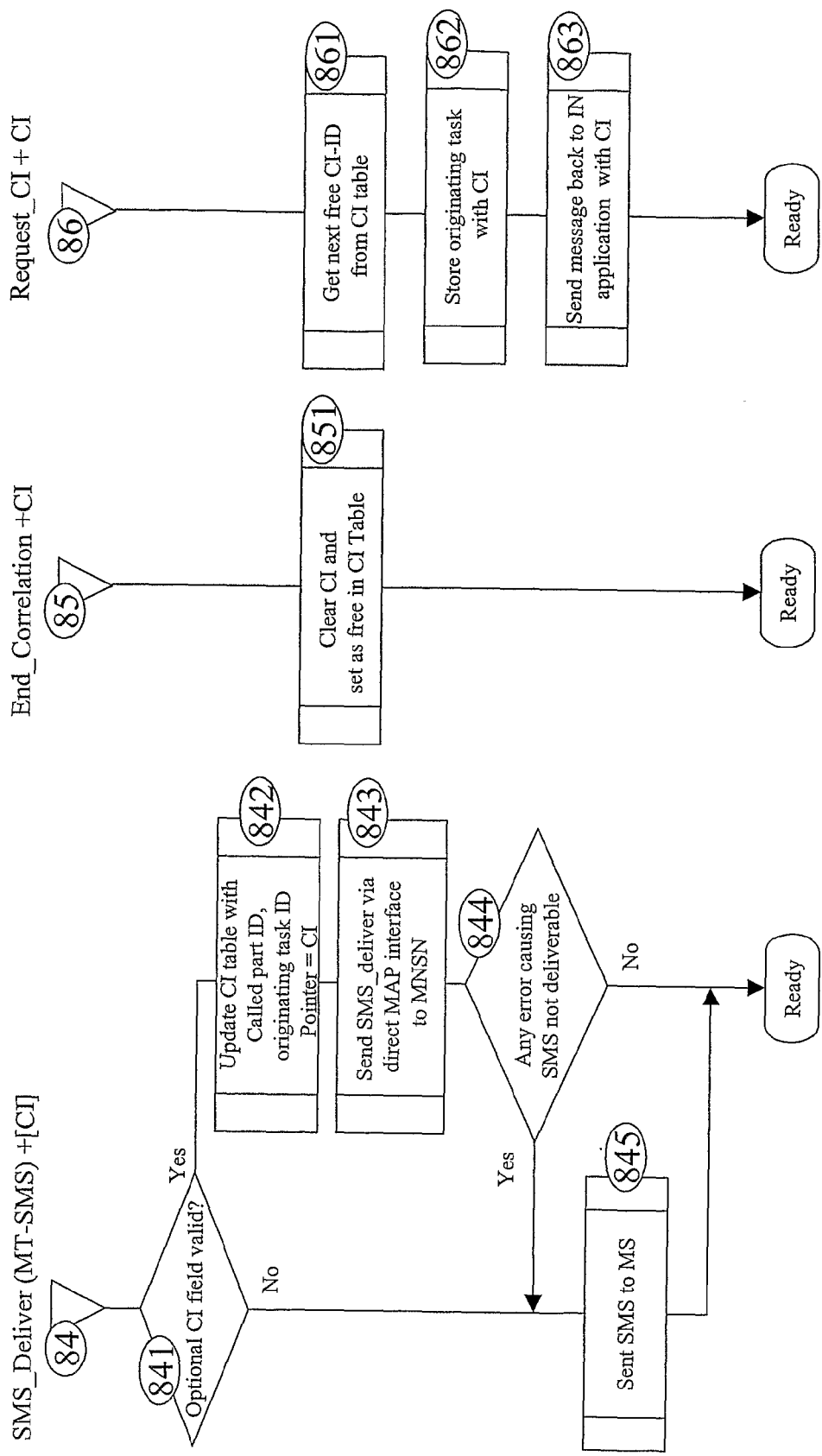

TELECOMMUNICATION SYSTEM AND METHOD FOR TRANSFERRING SMS MESSAGES BETWEEN TERMINALS AND INTELLIGENT NETWORK SERVICES

FIELD OF THE INVENTION

The present invention relates to a telecommunication system for transferring SMS (Short Message Service) messages between terminals, between terminals with intervention of an Intelligent Network (IN) service, or between a terminal and an IN service.

DESCRIPTION OF THE PRIOR ART

Telecommunication systems for making telephone calls, and transferring data, comprising a telecommunication network such as a Public Switched Telecommunications Network (PSTN) or a Public Land Mobile Network (PLMN), are often equipped with Intelligent Network (IN) services. These IN services enhance the functionality of the telecommunication system and allow for personalised services offered by or via the telecommunication system.

These services comprise for example "short number services" allowing the user to contact a personal voice mail box by using a short, generic number, or "personal number services", where a number is coupled to a person instead of to a telephone extension. Also IN services comprise pre-paid services, toll free calling services, credit-card services and Virtual Private Network (VPN) services, allowing groups of users, such as employees of a company to make use of a public telecommunication system while obtaining a functionality comparable to a private telecommunication network such as a Private Branch exchange (PBX).

A special group of IN services are those that can be invoked or controlled by SMS messages. An example of invocation of an IN service is the "Group SMS Service" in which a user can send an SMS from his Mobile Terminal to a group of persons without the burden of sending each SMS separately. An example of controlling an IN service is the "Group SMS Update Service" in which a user can modify his group lists (as used by the "Group SMS Service") by means of an interactive sequence of SMS messages with the "Group SMS Update Service". These services require transportation of SMS messages between the Mobile Terminal and the IN service.

In the prior art transport of SMS messages, an SMS message is send by a Mobile Terminal via a Mobile Network to a Mobile Network Switching Node. The Mobile Network Switching Node forwards the SMS to a gateway node that on its turn forwards the SMS to a Message Server. The Message Server forwards the message to an Intelligent Network Control Node that will start (when not already running) an intelligent network application module for the requested IN service and forwards the SMS message to that application. An SMS message generated by the intelligent network application module follows the opposite route to the mobile terminal.

A major problem is the accumulating delays in this store & forward transport. Depending on the SMS message load, the delays vary substantially. For interactive SMS message sequences between a mobile terminal and an IN service, the accumulating delays provide a nuisance to user of the service and cause IN services to time-out on no response received in time.

SUMMARY OF THE INVENTION

The object of the present invention is to improve the SMS transport mechanism. This objective is achieved, by the present invention, in a telecommunication system comprising:
- at least one Mobile Network,
- at least one Mobile Terminal operationally connectable to the Mobile Network,
- at least one Mobile Network Switching Node connected to the Mobile Network,
- an Intelligent Network Control Node connected to the at least one Mobile Network Switching Node via a control interface,
- at least one Intelligent Network Application module connected with the Intelligent Network Control Node via an application interface, characterised in that the Intelligent Network Control Node is connected to the at least one Mobile Network Switching Node via a data interface for the exchange of SMS messages.

The Intelligent Network Control Node comprises data interfaces for exchanging SMS messages with the at least one Mobile Network Switching Node, and the least one Mobile Network Switching Node comprises data interfaces for exchanging SMS messages with the Intelligent Network Control Node.

Advantageously, the present invention reduces the uncontrolled delays and the average transfer time of an SMS message there by providing a major improvement of the SMS transport mechanism. This makes interactive SMS message sequences (SMS dialogues) between a mobile terminal and an IN service possible, without timeout of the IN applications. Advantageously the present invention also removes the nuisance experienced by users relating to response times when sending SMS message from their mobile terminal to the IN services.

The present invention opens opportunities for providing new IN services based on interactive SMS dialogues. The present invention enables interactive control of IN services based on plain text and making control more user friendly. The present invention also enables users or other authorised persons to have easy access to the generic and user related data and the ability to easily change their profiles supported by IN services.

The present invention, in a further embodiment thereof, comprises a correlation mechanism for correlating a mobile terminal with an IN service for subsequent SMS messages in an SMS dialogue. The correlation mechanism also correlates the destination control of SMS messages via the control interface with the actual SMS message transport via the data interface. The correlation mechanism comprises:
- the execution of a correlation function as implemented in a adapted Transport Layer Controller of the Intelligent Network Control Node
- a Correlation Identifier Table, holding Correlation Identifiers each comprising a Correlation Identifier Number, a "FREE/BUSY" flag, a Task/process Identifier and a Mobile Party Identifier,
- a pointer containing the Correlation Identifier Number of the next free Correlation Identifier in the Correlation Identifier Table.

In another embodiment, the present invention comprises an extension of the Application Interface between the Intelligent Network Application modules and the Intelligent Network Control Node enabling the Intelligent Network Application modules to control the SMS message transport and the correlation mechanism. The extension comprises:

Request_CI by which the IN application can start a correlation process for an SMS dialogue and obtain a Correlation Identifier Number, End_Correlation by which the IN application can terminate a correlation process, Initial_DP_SMS signalling the IN application that an SMS message is waiting and is subject to its control, Connect_SMS by which the IN application can control the destination of the waiting SMS message including reception by it self, SMS_Submit by which the waiting SMS is transferred to the IN application, SMS_Deliver by which the IN application can sent an SMS to a mobile terminal.

The present invention further provides an Intelligent Network Control Node connectable to at least one Mobile Network Switching Node via control interfaces for controlling destinations of SMS messages and connectable to at least one Intelligent Network application module via an application interface, characterised in that said Intelligent Network Control Node comprises data interfaces towards the at least one Mobile Network Switching Nodes, adapted for exchanging SMS messages.

The present invention further provides a Mobile Network Switching Node a connectable to an Intelligent Network Control Node via a control interface for controlling SMS message destinations, characterised in that said Mobile Network Switching Node comprises a data interface towards an Intelligent Network Control Node adapted for exchanging SMS messages.

The present invention further comprises a method for sending SMS message from an IN application to a mobile terminal having the additional feature of rerouting the SMS message when the routing via the data interface fails.

This method for transferring an SMS message, comprising a header and a body, from a Mobile Terminal via Mobile Network Switching Node, control interfaces and data interface, Intelligent Network Control Node, and application interface to an Intelligent Network application module comprising the steps of:

transmitting of the SMS message by the terminal to a Mobile Network Switching Node, checking of the SMS message for possible invocation of an Intelligent Network Service, by the node, forwarding of the header by the node via a control interface to an Intelligent Network Control Node, forwarding the header by the node via an application interface to the application, analysing and adjusting, where required, the header by the application, sending the header back to the node via the application interface by the application, forwarding of the header by the node via the control interface to the node, updating of the SMS message with the header received, by the node, forwarding the SMS message by the node via a data interface to the node, forwarding the SMS message by the node via the application interface to the application.

Further features are illustrated by the non-limiting embodiments of the present invention.

BRIEF DESCRIPTION OF THE DRAWINGS

FIG. 8a shows a handling routine for the Initial_DP_SMS routine according to the present invention.

FIG. 8b shows a handling routine for the Connect_SMS routine according to the present invention.

FIG. 8c shows a handling routine for the SMS_Submit routine according to the present invention.

FIG. 8d shows a handling routine for the SMS_Deliver routine according to the present invention.

FIG. 8e shows a handling routine for the End_Correlation routine according to the present invention.

FIG. 8f shows a handling routine for the Request_CI routine according to the present invention.

DETAILED DESCRIPTION OF THE INVENTION

The prior art SMS comprises a header part and a body part. The header comprises amongst other parts a source field (calling party field) which contains a unique identification (ISDN) of the sending terminal, a destination field which contains a unique identification (ISDN) of the destination, an identification field containing the identification of a Mobile Network Switching Node (MSC_ID), and a field containing the identification of a Message Server (SMSC_ID). Full details of various elements of an SMS are specified in 3GPP TS 23.040.

Figure 1:
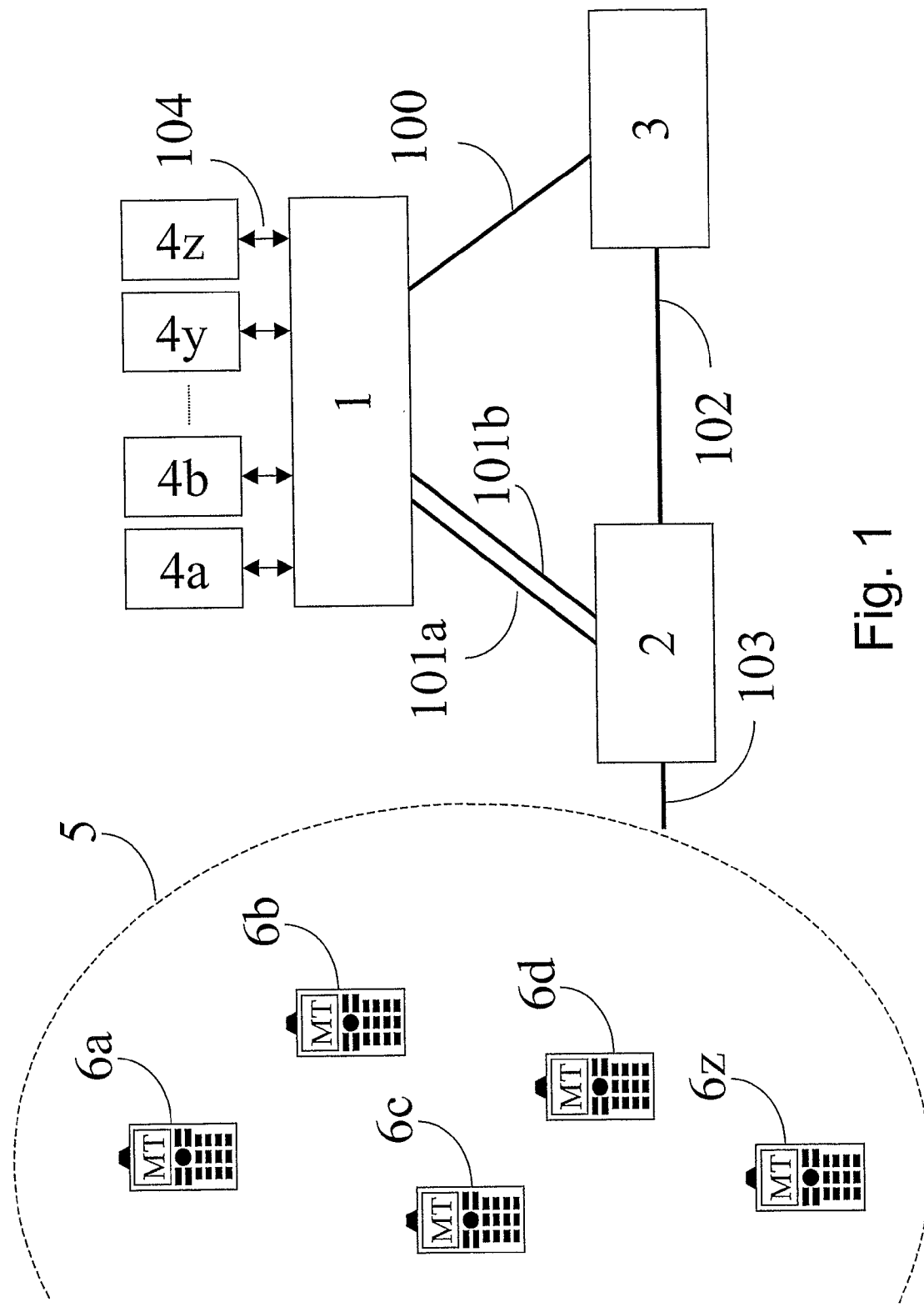
FIG. 1 shows a block diagram of the relevant part of a Telecommunication System.

The prior art SMS transfer involves the following elements of a Telecommunication System, referring to FIG. 1.

One or more Mobile Telecommunication Systems being part of the Telecommunication System and comprising a plurality of Mobile Terminals, terminal (6a-z), and a Mobile Network, network (5). The terminals (6a-z) utilize a radio link for their connection to the network (5). The Mobile Telecommunication System is based on a standard as defined in GSM, GPRS, UMTS or comparable standards.

One or more Mobile Network Switching Nodes, Node (2), connected to the Network (5), via an interface (103) and acting as gateway to the Network (5) for SMS messages. The Node (2) may comprise a MSC (Mobile switching Services Centre) for circuit switched SMS or a SGSN (Serving GPRS Service Node) for packet switched SMS.

One or more Message Servers, Server (3), connected via an interface (102) to the Node (2) based on the MAP (Mobile Application Part) protocol and to an Intelligent Network Control Node, Node (1) with an interface (100). The Server (3) can be any combination of hard and software that relays messages between terminals in the Telecommunication System, like an SMS Switching Centre, SMSC, or the combination of an SMSC and related gateway nodes, Inter Working Node, to perform that function. The Inter Working Node being for circuit switched SMS an IWMSC and in the case of packet switched SMS an IWSGSN.

An Intelligent Network Control Node, Node (1), connected to at least one Server (3) with interface (100), at least one Node (2) with an interface (101a) using the CAP (CAMEL Application Part) protocol, and at least one Intelligent Network application module, Application (4a-z) controlled by the Node (1) via an interface (104).

One or more Intelligent Network application modules, Application (4a-z), providing one or more IN services in the Telecommunication System.

The present invention comprises the interface 101b, based on the standard MAP protocol, the special adaptations in the Node (1) and the Node (2), and the adaptations to the interface (104). The MAP protocol is specified in 3GPP TS 23.040 and TS 29.002, the CAP protocol in 3GPP TS 23.078 and TS 29.078.

Mobile Network Switching Node, Node (2)

Figure 2A:
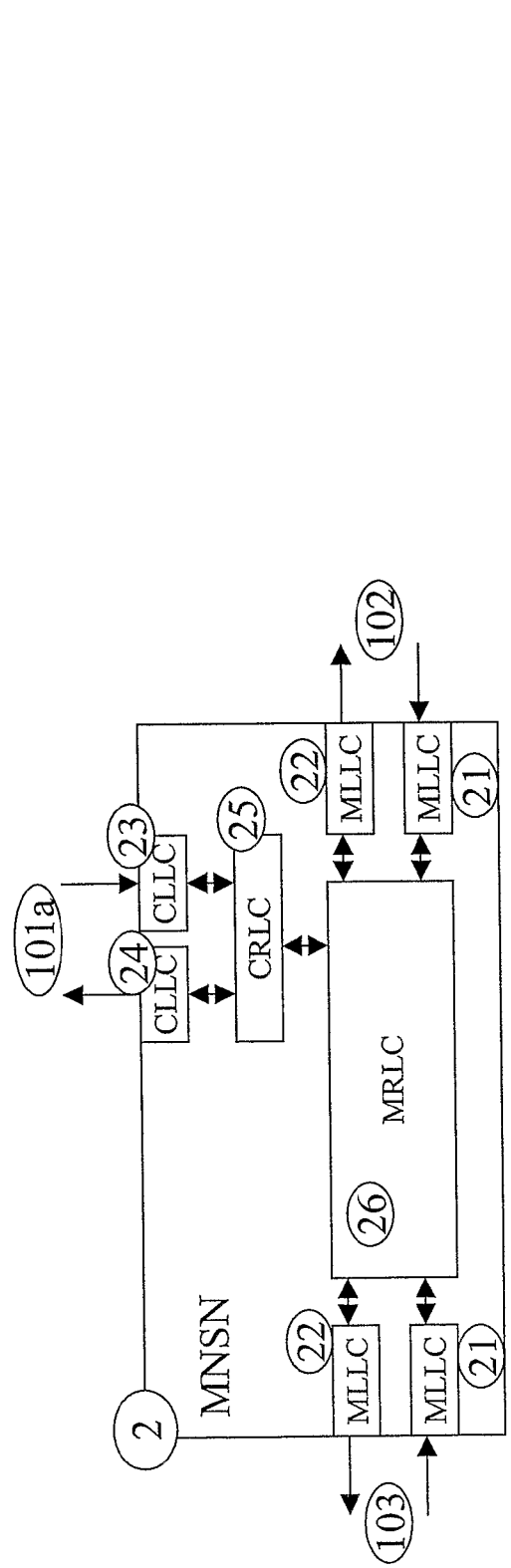
FIG. 2a shows a block diagram of a prior art Mobile Network Switching Node.

The prior art Node (2) is outlined in FIG. 2a. The Node (2) has an interface (103) towards the Mobile Network (5) and an interface (102) to at least one Server (3). Both interfaces based on the MAP protocol. The Node (2) is equipped with MAP Link Layer Controllers configured to handle input, ML-Controller (21), or output, ML-Controller (22), according to the MAP Link Layer protocol stack. The ML-Controllers (21) and (22) are connected to a MAP Relay Layer Controller, MR-Controller (26). The MR-Controller (26) is routing SMS messages received via the Network (5) to the correct Server (3) and from the Servers (3) to the Network (5). The handling protocol is specified in the MAP Relay Layer Protocol stack.

The routing is based on a destination field in SMS headers. The MR-Controller (26) can modify the destination field based on information received via an interface (101a) from the Node (1). This interface is CAP based.

The Node (2) is equipped with 2 CAP Link Layer Controllers; one configured for input, CL-Controller (23) and one for output, CL-Controller (24) handling the Link Layer protocol stack like SS7 or SIGTRAN. Further the Node (2) is equipped with a CAP Relay Layer Controller, CR-Controller (25). The CR-Controller (25) handles the CAP protocol stack and state machines and is connected to the MR-Controller (26).

Figure 2B:
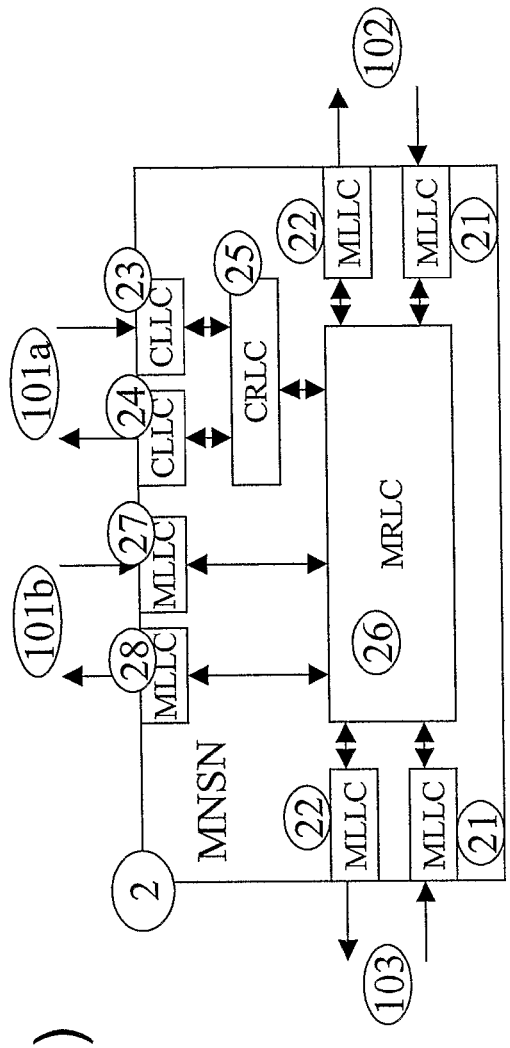
FIG. 2b shows a block diagram of a Mobile Network Switching Node, according to the present invention.

The special adaptation of the Node (2) according to the present invention is outlined in FIG. 2b. The Node (2) has one additional interface (101b) for the transfer of the SMS message to/from the Node (1). This interface is MAP based. The Node (2) is therefore equipped with 2 additional MAP Link Layer Controllers; one configured for input, ML-Controller (27) and one for output, ML-Controller (28). Both are connected to the MR-Controller (26). This additional interface allows the MR-Controller (26) to route SMS messages to the Node (1) or from the Node (1) to the Mobile network.

Intelligent Network Control Node, Node (1)

Figure 3B:
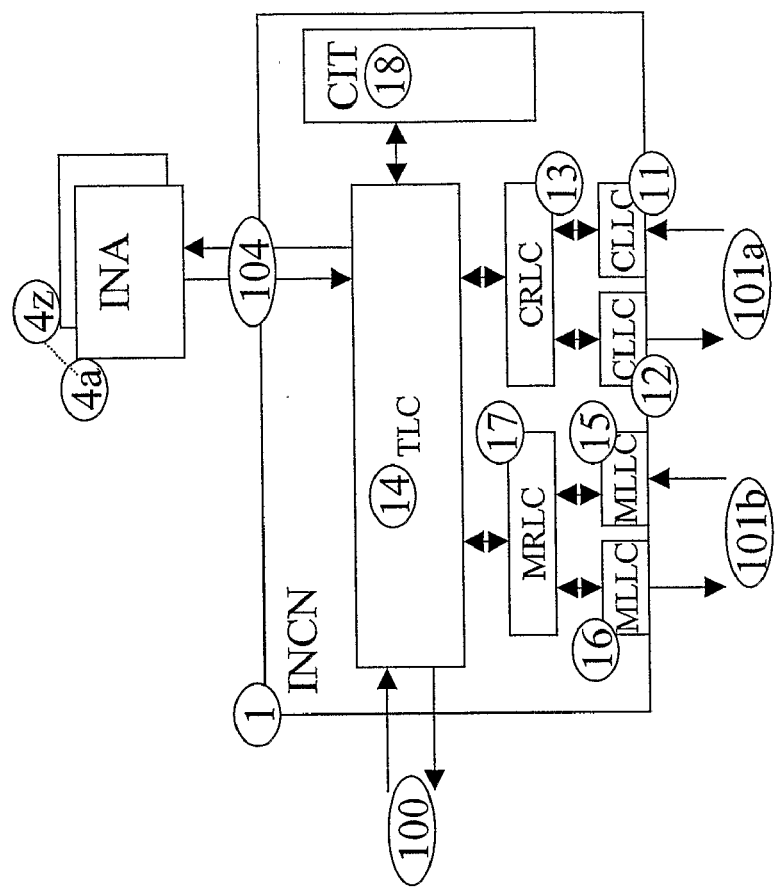
FIG. 3b shows a block diagram of an Intelligent Network Control Node, according to the present invention.
Figure 3A:
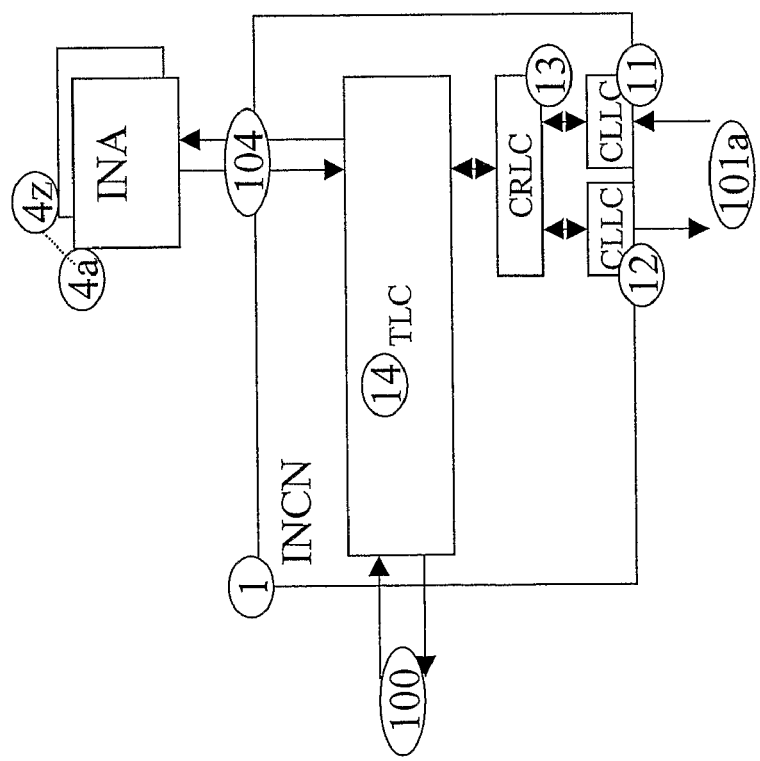
FIG. 3a shows a block diagram of a prior art Intelligent Network Control Node.
Figure 3C:
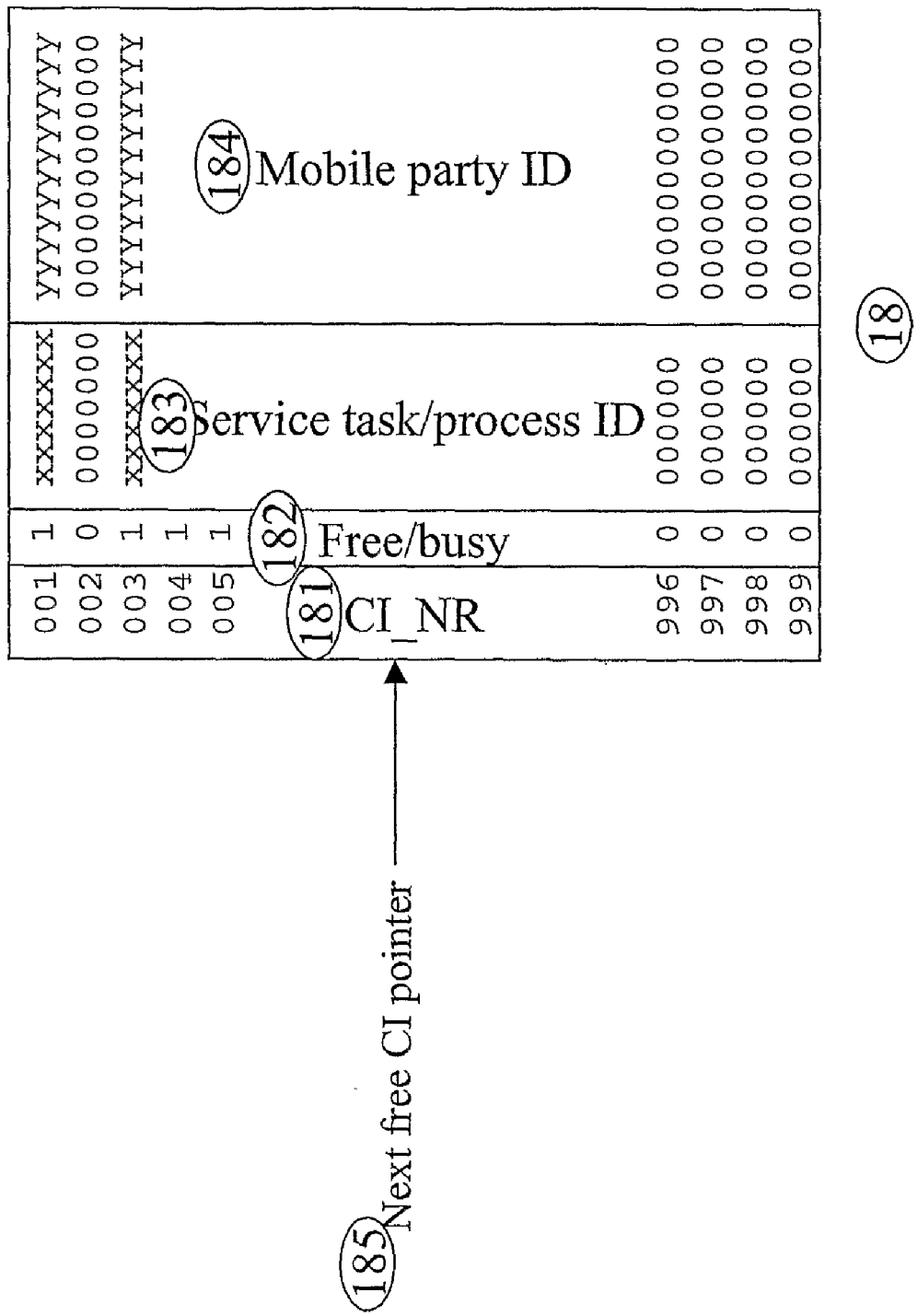
FIG. 3c shows a Correlation Identifier Table, according to the present invention
Figure 4A:
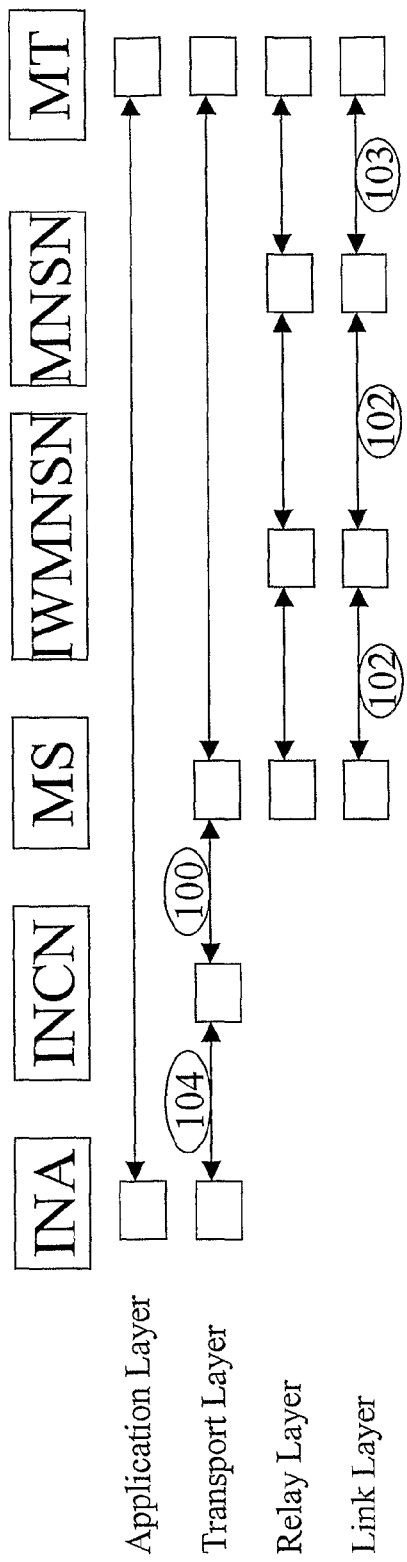
FIG. 4a shows a prior art SMS transport.
Figure 4B:
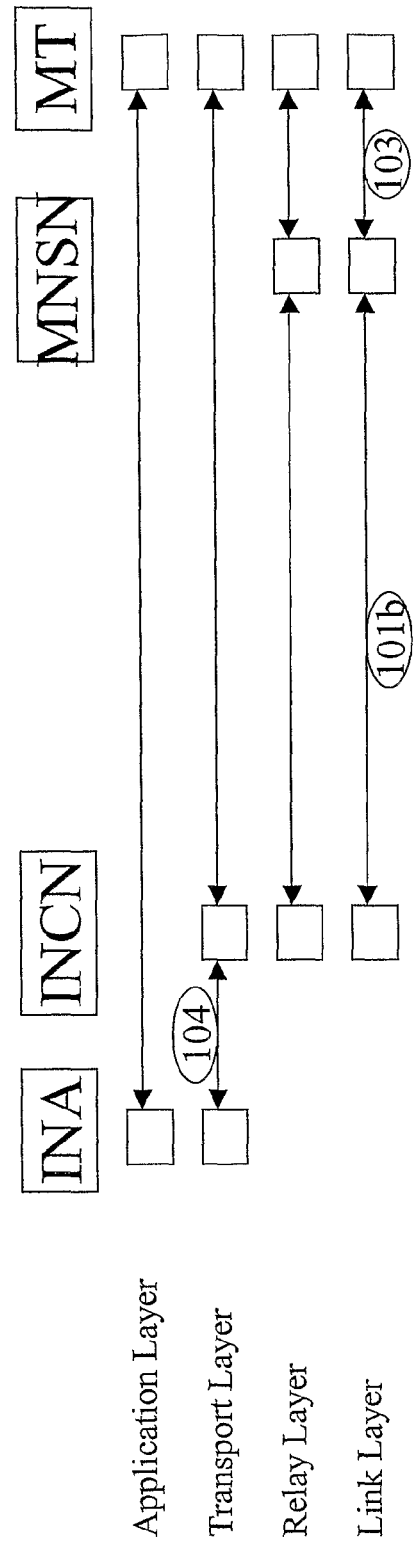
FIG. 4b shows an SMS transport according to the present invention.

The prior art Node (1) with the Applications (4a-z) is outlined in FIG. 3a. The Node (1) has interfaces (100) to one or more Servers (3), interfaces (104) to the Applications (4a-z), and interfaces (101a) to one or more Nodes (2). The interface (101a) is CAP based.

The Node (1) is equipped with 2 CAP Link Layer Controllers for each interface (101a) towards Nodes (2); one configured for input, CL-Controller (11) and one for output, CL-Controller (12). Each pair of CL-Controllers (11) and (12) is connected to a CAP Relay Layer Controller, CR-Controller (13) handling the CAP protocol stack and state machines. The CR-Controllers (13) are connected to the Transport Layer Controller, T-Controller (14). The T-Controller (14) controls the flow of information in the Node (1).

The special adaptation of the Node (1) according to the present invention is outlined in FIG. 3b. The adaptations comprise an additional interface (101b) to each Node (2) and related controllers, adaptations to the interface (104), and the Correlation Identification Table, Table (18).

Interface (101b)

The Node (1) has one additional interface (101b) for the transfer of the SMS message to/from each Node (2). This interface is based on the MAP protocol. The Node (1) is therefore equipped with MAP Link Layer Controllers; one configured for input, ML-Controller (15) and one for output, ML-Controller (16) per Node (2), both connected to a MAP Relay Layer Controller, MR-Controller (17). Each MR-Controller (17) is connected to the T-Controller (14). This additional interface allows the Node (1) to route SMS messages directly to a Node (2) or receive them directly from a Node (2).

Correlation Identifier Table, Table (18)

The Table (18) holds one entry=Correlation Identifier (CI) for each active dialogue with SMS messages between a Terminal (6a-z) and an Application (4a-z). The CI is required as the control of SMS destination via CAP is asynchronous from the SMS transport via MAP. The Table (18) holds a predefined number of entries, each entry identified with a CI-number (181) and comprising:

a "FREE/BUSY" flag, CI-flag (182) indicating whether the CI is free or currently in use, an identification of the task/process involved in the dialogue, Process-ID (183), identifying the Application (4a-z) and the running instance of that application, an identification of a mobile party involved in the dialogue, Party-ID (184), comprising an identification of the Terminal (6a-z) and the relevant Node (2).

When a CI is required, when an Application (4a-z) requests to receive an SMS from the Node (2), the T-Controller (14) in the Node (1) gets the CI-number via a "next free CI pointer", pointer (185). The CI-flag of that entry is set to "BUSY" and the pointer (185) automatically advances to the next higher CI-number that has the CI-flag set to "FREE". If the pointer reaches the highest CI-number it continuous with the lowest having the CI-flag set to "FREE". This has an additional advantage that CI's are reused only after a certain time. This time is dependent on the rate of CI requests and can be controlled by means of the length (number of entries) of the table. The performance of the correlation process on the other hand is strongly related to the length of the table as it scans the table for each received SMS message. The maximum number of simultaneous dialogues that the Node (1) can handle determines the minimum length of the table.

Interface (104)

The interface (104) between T-Controller (14) of Node (1) and the Applications (4a-z) is extended with following additional messages:

Initial_DP_SMS (Node (1)=>Applications (4a-z)) as specified in the 3GPP TS 29.078, indicating that an SMS is in the Node (2) with an IN service as destination, Connect_SMS (Applications (4a-z)=>Node (1)) as specified in the 3GPP TS 29.078 comprising two additional fields; a Get_SMS flag, indicating that the application wants to receive the SMS and a CI-field, containing the CI-number of an already started dialogue with SMS messages, SMS_Submit (Node (1)=>Applications (4a-z)) as defined in the 3GPP TS 23.040 delivering the SMS from the Node (2) to the application, SMS_Deliver (Applications (4a-z)=>Node (1)) as defined in the 3GPP TS 23.040 delivering the SMS from the application to the Node (2), extended with a CI-field that the application can use to enter a CI-number indicating that the SMS to be delivered belongs to an SMS dialogue, End_Correlation (Applications (4a-z)=>Node (1)) defined by one CI-field containing a CI-number to be set by the application to indicate that an SMS dialogue has been terminated either as it was ready or by time-out on reply, Request_CI (Application (4a-z)=>Node (1)=>Application (4a-z)) defined by one CI-field for a CI-number, to be added by the Node (1) on request of the application, when the application wants to start an SMS sequence with a Terminal (6a-z).

The operation of the additional interface is initiated by an SMS in a Node (2) having the identity of an IN service in the destination field. SMS messages not having the destination set to an IN service are directly forwarded by the Node (2) to the relevant Server (3). Alternatively an IN service can initiate, when triggered to do so, by other means then a received SMS.

The actual operation on the interface between Node (2) and Node (1) is determined by the Application (4a-z) and basically has three possible ways of operation:

Modification of SMS destination; a Node (2) informs the Node (1) via the interface (101a) that an SMS is waiting at the Node (2). The Node (1) starts the relevant application for an invoked IN service and forwards the information from the Node (2) in an Initial_DP_SMS message to the application. The application can modify the actual destination and Server to be used. The applications returns a Connect_SMS message with this information to the Node (1). The Node (1) forwards to the Node (2). The Node (2) updates the relevant fields in the SMS. The SMS is forwarded to the right Server for further transport to the final destination. This mode of operation is typical for as example sending an SMS to a VPN number, where the application has to alter the VPN number into an actual destination ID.

Redirection of SMS to IN service; a Node (2) informs the Node (1) via interface (101a) that a message is waiting at the Node (2). The Node (1) starts a relevant application for an invoked IN service and forwards the information from the Node (2) with an Initial_DP_SMS message to the application. The application wants to receive the SMS and sends a Connect_SMS message with a Get-SMS flag set to the Node (1), which forwards the message to the Node (2) after is has modified a MS_ID to its own Node_ID. The Node (1) also creates the CI to be able to send the SMS received from the Node (2) somewhat later to the right application. When the Node (1) has received the SMS it will forward it with an SMS_submit message to the application. After the application has received the SMS it signals the Node (1) with an End_Correlation message including the CI-number in question to indicate that the dialogue is complete.

SMS dialogue between Terminal and IN service; the operation starts as for the previous. The application does however not terminate after getting the SMS but answers with a reply SMS to the terminal requesting further input, selection, decision or the like. The application therefore sends an SMS_Deliver message including the CI-number belonging to the dialogue to Node (1). Node (1) forwards to Node (2), and Node (2) takes care for delivery to the terminal. The application keeps waiting and the received reply of the terminal needs to be sent to the waiting application. The Node (1) therefore scans, for each new SMS from Node (2), whether a sending party ID in the SMS matches any Party-ID in the table. Based on the Process-ID from the table the SMS is forwarded to the correct application. The dialogue continues until after the last reply of the terminal the application terminates the correlation for the dialogue. The application can terminate early when a time-out occurred on an expected Terminal reply.

Detailed Operation

The detailed operation is explained with four IN services:

VPN SMS service, where an IN service has to alter a VPN destination of an SMS into an actual destination of a terminal.

Group SMS service in which a terminal submits an SMS to an IN service indicating a group that should receive the SMS. The IN service takes care that the SMS is copied and send to each member of the indicated group. The IN service also sends an SMS back to the originating terminal that the order is executed.

The group SMS update service that allows a user via its terminal to create or update a group in the group SMS service. In this application the user initiates an SMS to the service that starts an interactive dialogue with SMS messages.

The Photo album service as another example of an IN service that allows a user to store pictures taken with a mobile phone on an own library in the telecommunication system. He can retrieve pictures on his mobile phone or access his library via the Internet.

It should be noted that these applications are just a few examples of very many possible applications that make use of the present invention.

VPN SMS Service

Figure 5:
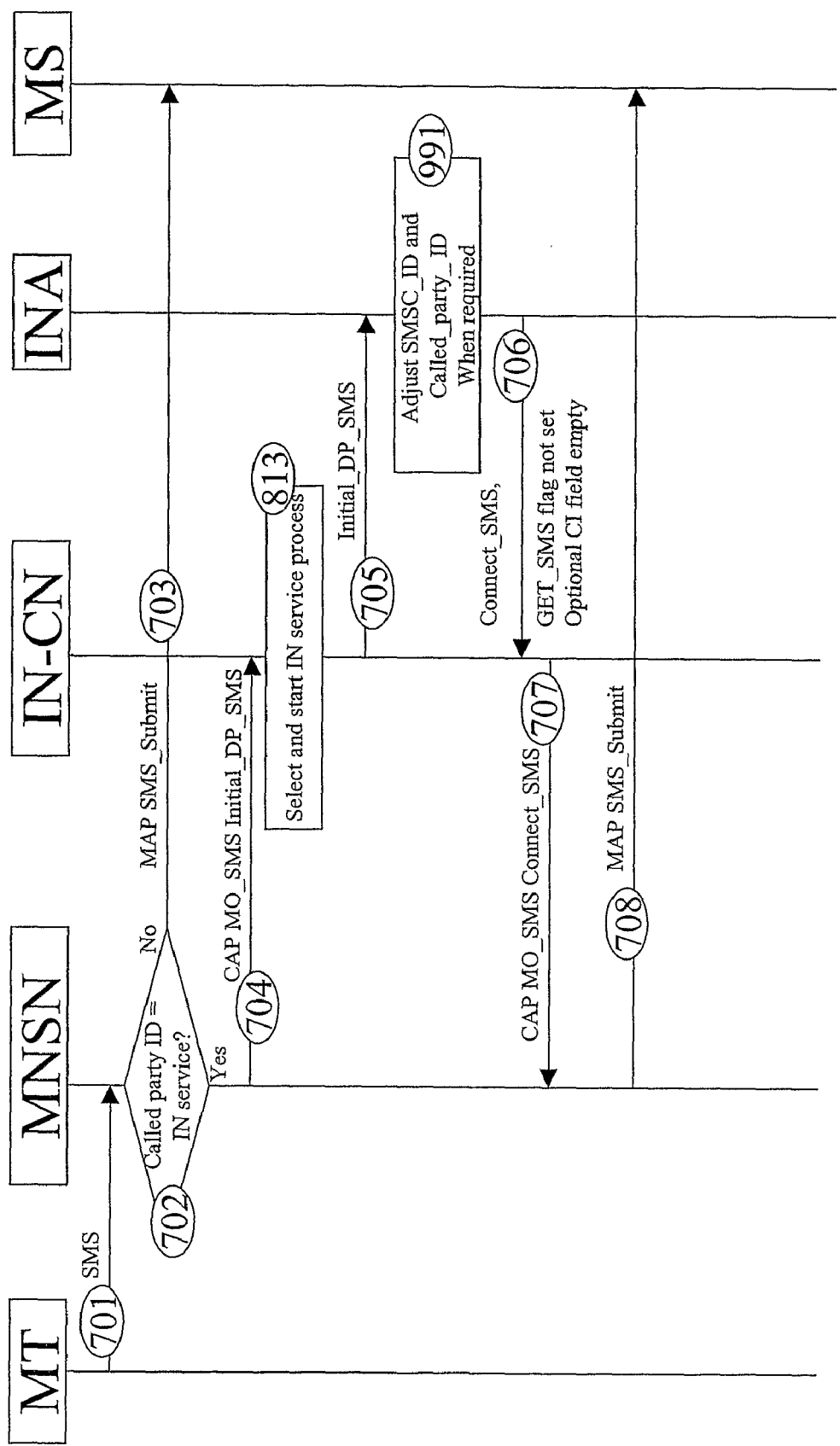
FIG. 5 shows a prior art sequence of an SMS destination modified by an IN service.

The mobile user wants to send an SMS to a single other terminal but does not use a full ten digit ISDN as destination but instead uses a four digit short number. The actual representation of the four digits short number can vary based on a connection profile behind the 4-digit number. The IN service invoked needs therefore to alter the destination from four digits to a full ISDN. The basic operation is outlined in FIGS. 5 and 8.

The Node (2) receives the SMS (701) from the terminal. It checks (702) if the destination is an IN service. In this case indirectly as it is an incomplete ISDN number the Node (2) will invoke an IN service (in this case VPN). The Node (2) therefore sends the MO_SMS Initial_DP_SMS message (704) via the CAP interface to the Node (1).

The Node (1) then compares (811) the source ISDN with Party-IDs stored in the Table (18). As no match is found the Node (1) will start (813) an instance of the correct application for this IN service and transfers an Initial_DP_SMS message (705) to the application.

The application acts (991) with preparing a Connect_SMS message by adding a correct ISDN for the destination and update of a relevant Server identification (SMSC_ID) when required. As the application does not require the actual SMS no GET_SMS flag is set and CI field is left empty. The application sends the Connect_SMS (706) back to the Node (1).

The Node (1) receives the Connect_SMS message and checks (821) whether the GET_SMS flag is set. Because it is not set, it continues to prepare the MO_SMS Connect_SMS message (707) and sends it to the Node (2).

The Node (2) updates the relevant fields in the SMS header as indicated in the MO_SMS Connect_SMS message and forward the SMS to the indicated Server (SMSC_ID) with a MAP SMS_Submit (708).

Group SMS Service

The mobile user that wants to send an SMS to a group, writes the SMS, but instead of the ID of an other user, the destination (called party) ID is set to the ID of the IN service including the identification of the group. Example *700#0000201 in which 700 identifies the IN group SMS service and 0000201 identifies the Group. The SMS (710) is transported via the Network (5) to the Node (2) via interface (101a).

The Node (2) checks (711) the destination. As the MSNS recognizes that the destination is an IN service it will invoke the CAP protocol by sending an MO_SMS Initial_DP_SMS message (713) to the Node (1).

The Node (1) receives the message and retrieves the source ISDN from the message. This ISDN is compared (811) to party-ID's stored in the table (18). When no match is found, it is treated as a first SMS, and the Node (1) will start-up (813) the correct application for executing the requested IN service, based on the contents of the destination field. If a match is found, then the message is treated as one belonging to a dialogue and the process-ID is retrieved (812) from the table, from the record where the Source ISDN and the Party-ID matched. In either case Node (1) sends the Initial_DP_SMS message (714) to the application as received. Further actions depend on the application.

In case of a group SMS the application requires not only the SMS header information in the initial_DP_SMS message but also the contents of the SMS. The application prepares a Connect_SMS message and sets the GET_SMS flag in order to retrieve the contents. The CI-number is not yet known so the CI field stays empty. It then sends the Connect_SMS message (715) to the Node (1).

The Node (1) receives the message. It checks (821) the received Connect_SMS whether the GET-SMS flag is set. When no flag is set, no CI is prepared and the Connect_SMS message is directly transferred (826) as MO_SMS Connect_SMS message (716) to the Node (2).

When a flag is set (which is the case in group SMS), the Node (1) checks (822) whether a valid CI-Number is in the CI field. In this case there is not a valid CI-number, and the Node (1) gets (823) the next free CI-Number, as indicated by the pointer (185). The process-ID of the originating task/process and the Party-ID as in the source and destination ISDN fields of the Connect_SMS messages are stored (824) in the table on a position indicated by the obtained CI-Number. Before the message is sent to the Node (2), the Node (1) replaces (825) the Party-ID in the destination ISDN field by the CI-Number, and the SMSC_ID field by the own Node(1)_ID as used for the MAP protocol.

It is especially advantageous to update the Process-ID and Party-ID with each Connect_SMS message, even when part of a larger dialogue. Intermediate storing the Process-ID allows one application to invoke another application and still the received SMS will go to the correct application. Storing each time the Party-ID together with the relevant Node (2) identification ensures that the correlation has an optimal base, even when the terminal is moving and the relevant Node (2) changes.

When Node (2) receives the MO_SMS Connect_SMS message, it will change the fields in the SMS header to values as stated in the message. Then the SMS is sent via the MAP protocol using an SMS_submit message (717). Due to the fact that the Server (SMSC_ID) is now the Node (1)_ID the message is automatically forwarded to the Node (1) via interface (101b) using the MAP protocol. The Node (1) will retrieve once received (831) the CI-number from the destination ISDN field in the SMS header. Then the Node (1) retrieves (832) with this CI-number the process-ID from the table (18). The SMS is then as received send (833) to the application with an SMS_Submit message (718).

The application stores (993) the received CI-number from the destination ISDN field for later usage and copies the SMS, as many times as there are entries in the identified group. Each destination ISDN is replaced by the relevant ISDN from the group definition. The so created SMS messages are sent back to the Node (1) as SMS_deliver messages (720). The CI-field of these messages is empty.

The Node (1) checks (841) incoming SMS_Deliver messages for a valid CI. When not present the messages are forwarded (845) to the relevant Server.

The last message initiated by the group SMS service is a message to the originating terminal that all messages have been sent. This SMS is also sent by SMS_Deliver only now the application fills the CI field with the value retrieved from the destination ISDN field in the SMS sent originally via SMS_Submit.

The Node (1) receives this last message and finds a valid CI-number (841). It stores (842) party-ID and process ID in the table in the record indicated by the CI-number. The Node (1) now uses the interface (101b) to the Node (2) to transport (843) with a MAP SMS_Deliver message (722).

If the Node (2) does report back with a delivered message the Node (1) stops further actions. If the Node (2) sends back (844) a non-deliverable message then the Node (1) will sent the SMS to a Server. The later can be the case when a mobile terminal is on the move and in the mean time the Node (2) becomes no longer responsible for the terminal.

The last act from the application (996) is to sent an End_correlation message (733) to the Node (1). This message includes the CI-number for the dialogue. Upon receipt the Node (1) clears the entry in the table and sets (851) the CI-flag to "FREE".

Group SMS Update Service

The group SMS update service allows a user via a terminal to create or update a group in the group SMS service.

It shall be clear to a person skilled in the art that SMS groups are linked to the ISDN of the user's terminal. Wherever new, existing or check of group ID's is mentioned the group ID's specific for that ISDN are mend.

It shall also be clear to the person skilled in the art that only the flow is given for the case that no errors occur as this application is for the mere illustration of how the present invention works. Items as users entitlement to use the services or all interactions on erroneous user input are omitted.

Figure 6:
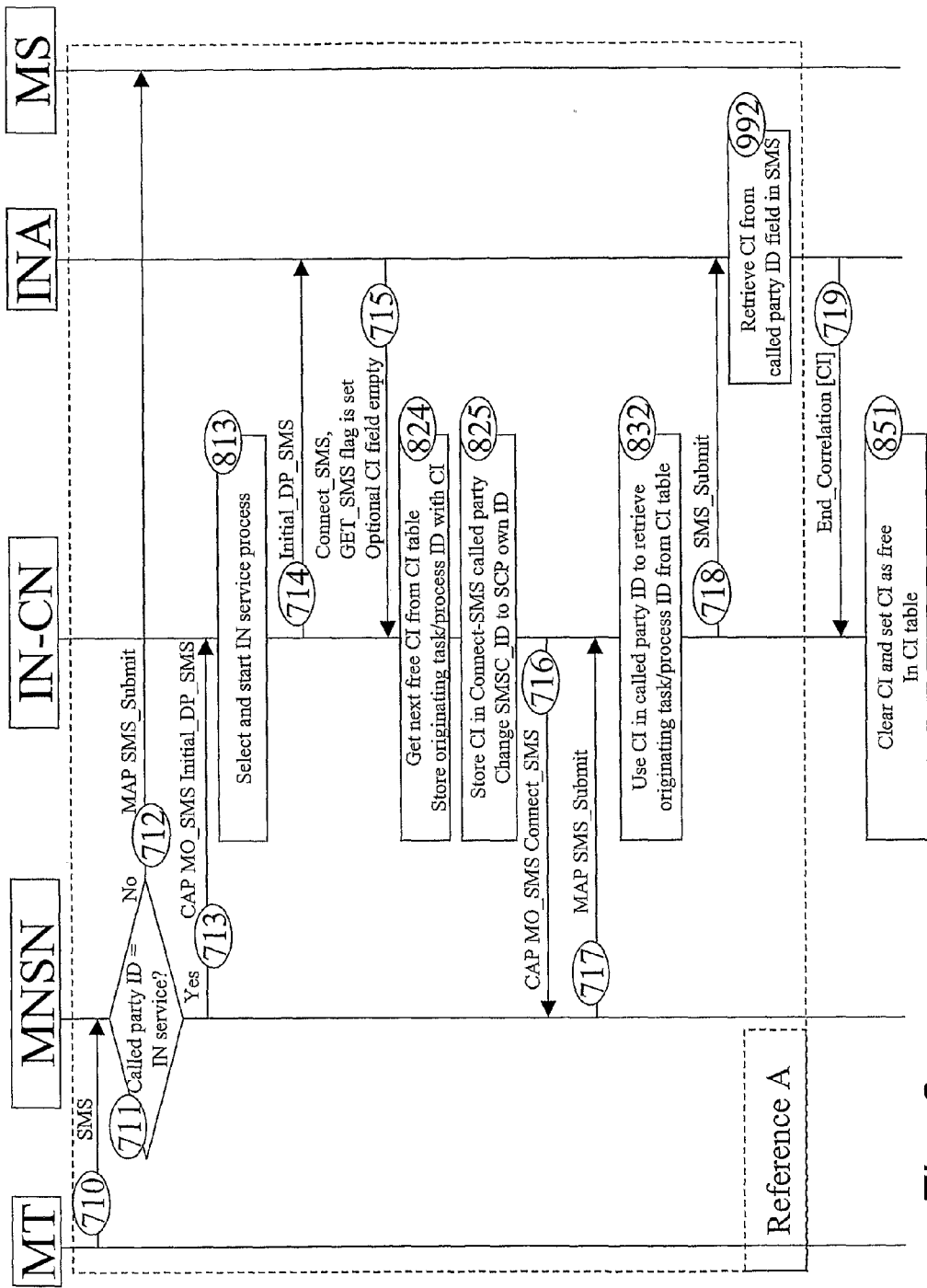
FIG. 6 shows a prior art sequence of an SMS redirected to an IN service.

The user at the terminal has 5 options to invoke the update service. For the complete flow of this service reference is made to FIGS. 8 and 9. The sequencing of messages between the involved nodes in the telecommunication system is illustrated in FIGS. 6 and 7.

Case 1 Invoking SMS with Only Service ID in Destination.

Figure 7:
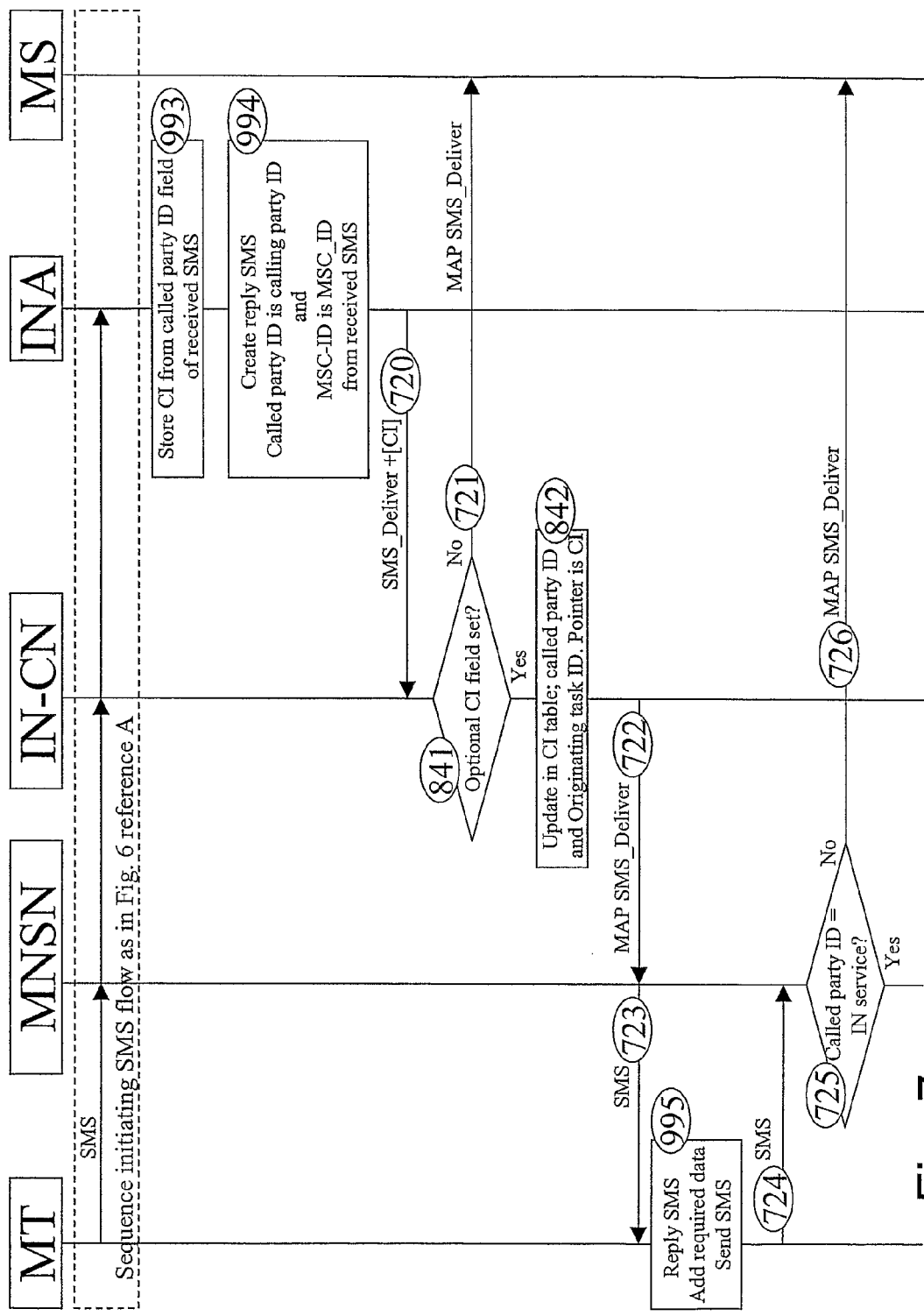
FIG. 7 shows an SMS transport sequence according to the present invention.
Figure 7:
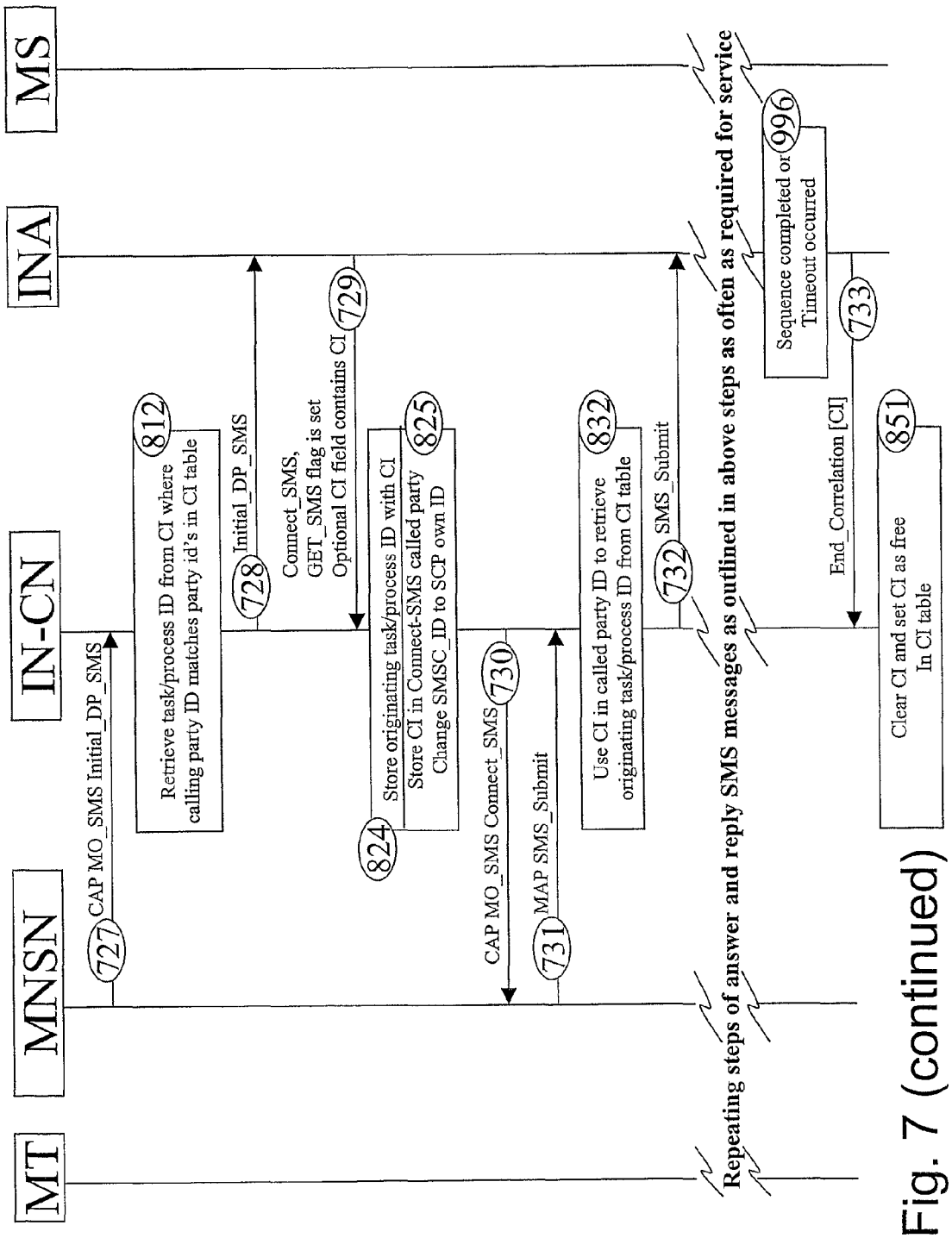
Figure 9:
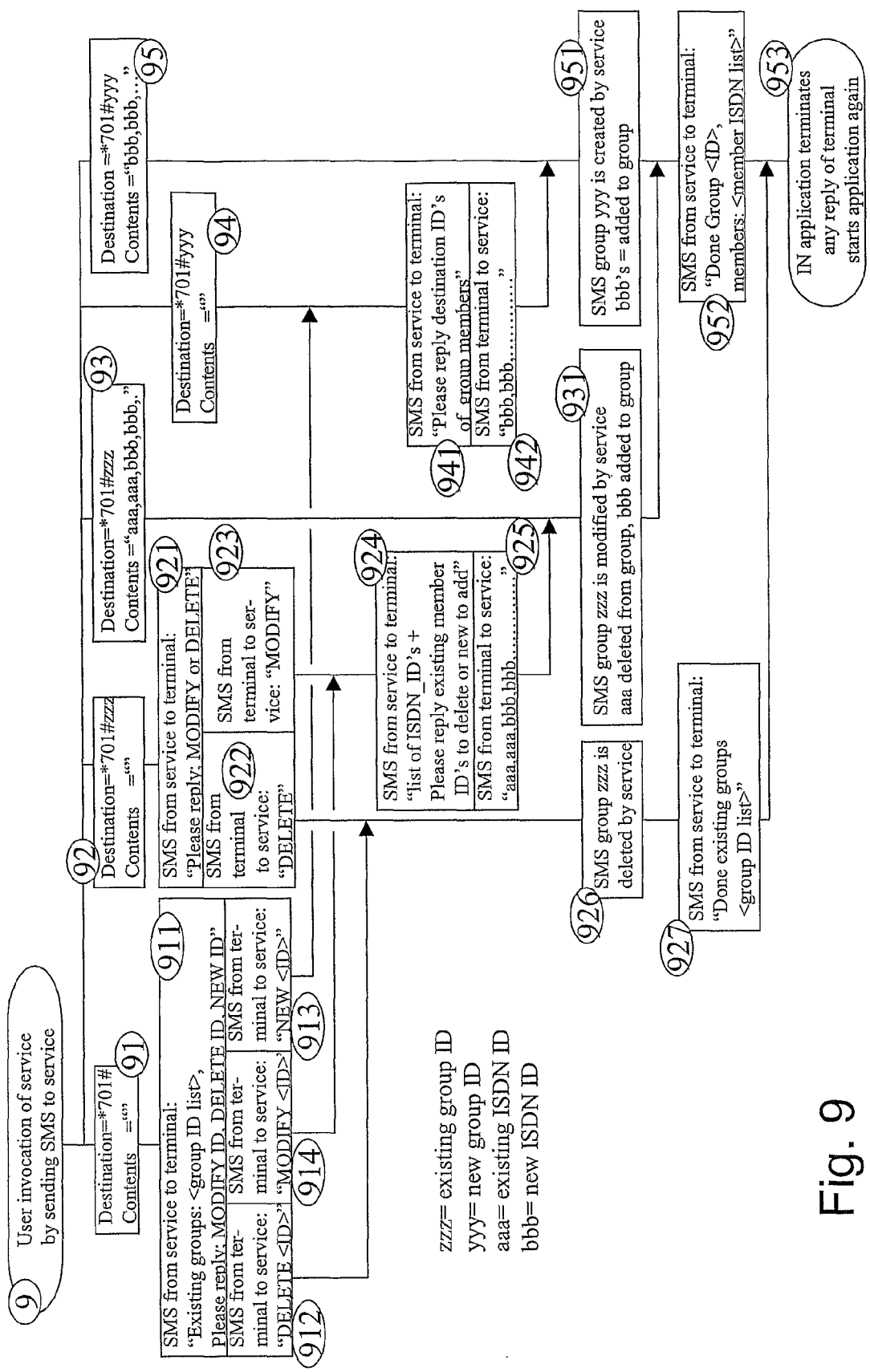
FIG. 9 shows a flow diagram of the UPDATE GROUPS SMS service as an embodiment of the present invention.

FIG. 7 and FIG. 9 Reference 91.

The user sends an SMS (710) no content is required and the destination is just the ID of the group SMS update service. As example "*701#". Alternatively he can set up a call to that number which has the same result.

The SMS (710) is sent via the network and is received by the Node (2). The Node (2) recognizes the invocation of an IN service (711) and sends an Initial_DP_SMS message (713) to the Node (1) using the CAP protocol.

The Node (1) receives the message and checks if the source ISDN in the initial_DP_SMS matches any party-ID in the table (811). As this is the first message such a match is not found and the Node (1) starts an application that handles the IN service (813). The Initial_DP_SMS message is sent to the Process-ID of the application (714). The application issues a Connect_SMS message with a GET_SMS flag set but with an empty CI-field (715). In this way the application receives a CI-number even when the contents of the SMS is of no interest.

The Node (1) receives the Connect_SMS message and checks, if the GET_SMS flag is set (821), and a valid CI-number is provided in the CI field (822). In this case no CI-number was present so the Node (1) retrieves a next free CI-number (823) as pointed by the CI pointer (185) and sets a corresponding CI-flag in the table to "BUSY". The Node (1) stores the source ISDN in the Connect_SMS message as well as the ID of the originating task/process in the corresponding Party-ID and Process-ID field of the record in the table pointed to by the CI-number (824). The Node (1) stores the CI-number in the destination ISDN field of the Connect_SMS message and sets the SMSC_ID field to the own Node (1)_ID (825). The message (716) is then sent to the Node (2) with the CAP protocol via interface (101a).

The Node (2) updates the SMS with the values received from the Connect_SMS message and the SMS is transported with SMS_Submit (717) under the MAP protocol via interface (101b). The Node (1) receives the SMS and fetches the CI-number from the source ISDN field, uses that to fetch the Process ID from the table (832) and forwards the SMS to that task/process (718). The application retrieves the CI-number as available in the source field of the SMS_Submit message (922) and stores it (993) as identification of the dialog in progress.

The application now checks (9) which situation is applicable based on the availability of a group SMS ID in the destination field, whether this is a known ID or a new ID, and the contents contains a list of ISDNs. In this case there is no group SMS ID so the application continues for case 1 (91). The application starts with assembling an SMS (994) containing a list of existing group IDs and a short text to reply an action including a group ID (911).

The SMS is sent to the Node (1) in the SMS_Deliver message (720) including the CI-number retrieved from the destination field of the invoking SMS. The Node (1) checks (841) on the optional CI field in the SMS_Deliver message, and finds a valid CI-number. Based on this, the SMS_Deliver message (722) is forwarded (843) to Node (2) as indicated in the message via the MAP protocol. Via the Network (5) the message (723) is sent to the user's terminal.

If for some reason the transport was not successful, this will be indicated by the Node (2) to the Node (1). The Node (1) reroutes (844) then the message and sends it to a Server (845), which will then attempt to reach the terminal.

The user gets the message and replies it (995) giving a NEW+ID (913), MODIFY+ID (914) or DELETE+ID (912) message back.

This message (724) is sent via the network and is received by the Node (2). The Node (2) recognizes the invocation of an IN service (711) and sends an Initial_DP_SMS message (713) to the Node (1) using the CAP protocol. When received by the Node (1), it checks (811) the source field against Party-ID's stored in the table. As now a match is found, Node (1) retrieves (812) the Process-ID from the matching record and sends (814) the Initial_DP_SMS message (728) to that application. The application issues a Connect_SMS message (729) with a GET_SMS flag set and a valid CI-number in the CI field. The Node (1) checks the received Connect_SMS message on the GET_SMS flag (821) and CI-number (822) and in this case both are present. The Node (1) only updates (824) the table with the originating task/process ID and the contents of the source field. The Node (1) stores the CI-number (825) in the destination field of the Connect_SMS message and stores the own ID of the Node (1) in the SMSC-ID field. The Connect_SMS message (730) is then sent (826) to the Node (2) under the CAP protocol via interface (101a).

The Node (2) acts as described before and the SMS is forwarded to the Node (1) and subsequently to the application as described before.

The application investigates the contents of the SMS and goes into the correct branch. If the message contained a DELETE ID (912), the application continues as in case 2 when the user indicated that he wanted to delete a group (926). If it was a MODIFY+ID (913) then the application continues as described in case 2 after the mobile user indicates that he wants to modify (924). If it was a NEW+ID (913) the application continues as in case 4 (941).

Case 2 Invoking SMS with Existing Group ID in Destination.

FIG. 9 Reference 92.

In case 2 the user enters the IN service code and also an existing group ID. The application receives the SMS as described before in case 1. Upon receipt the application checks (9) the contents and finds an existing group ID in the destination but no valid ISDNs in the contents. The application continues for case 2 (92).

The application retrieves the indicated group from the destination field in the SMS header and stores it temporarily. Then the application assembles an SMS with the question to reply either delete or modify (921). The SMS is sent to the terminal as described in case 1.

When the terminal replies DELETE (922), the application deletes the indicate SMS group (926) and sends an SMS back including the message that the operation is executed plus the list of currently valid SMS group ID's (927). After sending the message the IN application terminates (953) with sending an End_Correlation message including CI-number to the Node (1) (85). The Node (1) then clears the data stored and sets the CI-flag to "Free" in the table in the record with the CI_number (851).

When the terminal replies MODIFY (923), the application assembles an SMS which includes a list of all ISDNs of the members currently in that group plus the question to reply either member ISDN's that are in the list to delete or new ISDNs to add to the list (924). The terminal receives the message as described in case. The user can now reply the SMS and enter new member ISDNs to be added or member ISDNs listed in the received SMS to delete (925). The application receives the SMS from the terminal as described in case 1, and continues as described in case 3 (931).

Case 3. Invoking SMS with Existing Group ID and Valid ISDNs in the Contents.

FIG. 9 Reference 93.

In case 3 the user enters the IN service code and also an existing group ID and a list of new member ISDNs to add and existing member ISDNs to delete. The application receives the SMS as described in case 1. Upon receipt the application checks (9) the contents and finds an existing group ID in the destination and valid ISDNs in the contents. The application continues for case 3 (93).

The application starts parsing the contents of the received SMS retrieving the ISDNs from the contents of the received SMS. The application updates the group identified in the destination field of the received SMS or when entered via case 2 from the temporarily store (931). Any ISDN matching the list of ISDNs in the identified group are deleted. Any not listed ISDNs are added to the group. The application continues as described in case 5 (952).

Case 4. SMS with New Group ID and no ISDNs in the Contents.

FIG. 9 Reference (94).

In case 4 the user enters only the IN service code and a new group ID. The application receives the SMS as described in case 1. Upon receipt the application checks (9) the contents and finds a new group ID in the destination and no valid ISDNs in the contents. The application continues for case 4 (94).

The application stores temporarily the new group ID as retrieved from the destination field in the received SMS header. The application assembles an SMS (941) requesting ISDNs for the members of the new group. This message is sent to the terminal of the user as described in case 1. The user can reply the SMS and add a list of ISDNs in the contents (942). The SMS is received by the application as described in case 1 and the application continues as described in case 5 (951).

Case 5. Invoking SMS with New Group ID and Valid ISDNs in the Contents.

FIG. 9 Reference 95.

In case 5 the user enters the IN service code, a new group ID and a list of new member ISDNs to add. The application receives the SMS as described in case 1. Upon receipt the application checks (9) the contents and finds a new group ID in the destination and valid ISDNs in the contents. The application continues for case 5 (95).

The application starts parsing the contents of the received SMS retrieving the ISDNs from the contents of the received SMS. The application creates the new group (951) with the ID retrieved from the destination field of the header of the received SMS or when entered via case 4 from the temporarily storage. Then the application adds the ISDNs from the parsing to the new group.

The application assembles a final SMS (952) containing the new group ID and the list of added members. This SMS is sent to the terminal as described in case 1.

The application terminates (953) with sending an End_ Correlation message to the Node (1) (85) including the CI-number. The Node (1) receives the message and then clears the data stored and sets the CI-flag to "FREE" in the table in the record with the CI-number (851).

Timeout.

When the application expects an SMS to be send by the terminal and this message is not received within a preset time, the application terminates (953) with sending an End_Correlation message (733) to the Node (1) (85) including the CI-number. The Node (1) will upon receipt (851) of the message clear the data stored and set the CI-flag to "FREE" in the table in the record with the CI-number (851).

The user can store the final messages send by the application (927 or 952) in his terminal. He has then appropriate view on which groups are available. Alternatively he can use the Enquiry group SMS application. This application is not discussed here bud works the same way as the update group SMS application where considering this invention.

Photo Album Service

The Photo Album Service is an IN service that provides 2 basic services, one storing photo's and one for retrieving photo's. Both will be discussed separately. Photo's are stored in a file storage location controlled by the application for the Photo Album Service. The indication of a storage position of a single photo comprises an ISDN of a terminal of a user and a sequence number unique for that ISDN.

The application maintains for each user that subscribed to this service a Storage Table indicating his personal storage numbers with a short text for indication and a physical storage addresses. Together with a photo the user has the possibility to add a short description for identification purposes.

The content (being the photo) is transferred via MMS (Multi Media Messaging) en will not be discussed in detail, as it is not subject of the present invention. The dialogue between user and the IN service makes use of interactive SMS sequences and is explained in detail. It might be clear for a person skilled in the art that photo here can be translated to read video clip, sound clip or anything else that can be represented by a computer readable file and is transferable via MMS.

Storing a Photo

The user at his terminal has the possibility to send his picture to an IN service that will store it in the user's personal album. The user at his terminal therefore sends the picture via MMS to the IN service. Once received by an application that handles this IN service, the application stores the photo at a next free location and updates the user's Storage Table indicated by the ISDN as obtained from the source field of the MMS. The application compiles an SMS to the mobile terminal confirming that the photo is stored. The application uses the information contained in the MMS header as destination ISDN, includes the storage number and a short text in the contents of the SMS asking the user to reply a short text for the purpose of identifying the photo.

As no CI-number is available the optional CI field is empty. A CI-number is however required to correlate the reply of the terminal to the application. The application therefore sends first a Request_CI message (86) to the Node (1). The T-Controller (14) in the Node (1) gets a next free CI-number (861), stores Process-ID of the originating application in the Table (18) in the record indicated by the CI-number (862). Node (1) adds the CI-number to the message and returns it to the application (863).

The application then sends a store confirmation message as outlined above to the Node (1) with the SMS_Deliver message. The CI field contains the CI-number as retrieved. See FIG. 8*d* reference 84.

Upon receipt the Node (1) checks for the CI field (841) and because it contains a valid CI-number the destination ISDN and the originating task/process id is stored in the table (18) in the corresponding fields Party-ID and Process-ID of the record indicated by the CI-number. The Node (2) ID is however lacking (844). The Node (1) therefore does not send it to a Node (2) but directly to a Server (845). From the Server it is sent to the terminal.

The user can reply to the message and enter a short text as reference description of the photo. The reply SMS of the user is sent via the network and is received at the Node (2). As the user, by replying has automatically entered the IN service as destination, the Node (2) notes the invocation of an IN service and sends an Initial_DP_SMS message with SMS header information to the Node (1) using the CAP protocol. See FIG. 8*a* reference 81. The Node (1) acts further as is described in the Group SMS service case 1.

The application stores the short text in the user's Storage Table and assembles an SMS to the user's terminal indicating that the operation is completed. This SMS is sent to the Node (1) with an SMS_Deliver message described before in Group SMS service case 1. The application then terminates or terminates because of a timeout when no reply was received in time. In both cases the application will issue an End_correlation message including the CI-number. See FIG. 8*e* reference 85. The Node (1) receives the message and clears the data stored and sets the CI-flag to "FREE", in the table in the record indicated by the CI-number (851).

Retrieving a Photo

The user can also retrieve a stored photo like when on holiday wanting to send an email with some photos as attachment. He therefore sends an SMS to the IN service. The destination includes the storage position of the photo to be retrieved. Example: *866#00012 in which *866 is the IN service and 12 the storage location. He can order more then one photo by entering the storage location numbers separated by non-numeral characters in the SMS contents part.

As it is unlikely that the user can remember each photo by its location he has also the possibility to use 000 or omit the storage position. The IN service will then first send a sequence of SMS messages giving him a survey of all stored photos including their short description. The user can reply to the SMS and enter the number of the storage position(s) in the SMS contents part.

The user sends the invoking message with his terminal via the network and is received by the Node (2). As the destination is an IN service the Node (2) will invoke the CAP protocol to send an Initial_DP_SMS to the application and the application replies with a Connect_SMS with a GET_SMS flag set and a CI field empty. As result the application will receive the full SMS via the Node (1).

The application acts by either:
  Sending an MMS with the photo(s) to the Mobile terminal using the destination details from the received SMS message when the destination and or contents had storage numbers. Non-valid storage numbers are omitted by the application. The application terminates with an End_correlation including the CI-number.
  Sending one or more SMS listing all occupied storage locations and the short description when the number in the destination was 0 or omitted. The application waits for receiving the reply. If a reply SMS is received by the application, it sends an MMS including requested photo(s) as described above. If done or no reply received in time the application terminates with sending an End_correlation message with the CI-number.

The invention claimed is:

1. An Intelligent Network Control Node connectable to a Mobile Network Switching Node via a control interface and connectable to at least one Intelligent Network application module via an application interface, wherein said Intelligent Network Control Node comprises
  a data interface towards said Mobile Network Switching Node for exchanging Short Message Service messages, and
  a Transport Layer Controller adapted for sending and receiving the Short Message Service messages via the data interface, said Transport layer Controller further comprising
    a correlation means for correlating said exchange of said Short Message Service messages through said data interface with destination control data exchanged through said control interface; and
  a Correlation Identifier Table holding Correlation Identifiers used by said Transport Layer Controller for correlating sending and receiving the Short Message Service messages via the data interface with the control of Short Message Service message destinations via the control interfaces, and wherein the Correlation Identifier Table further comprises
    a pointer for indicating the next free Correlation Identifier to use,
    a list of Correlation Identifiers, each Correlation Identifier having a Correlation Identifier Number,
    a "FREE/BUSY" flag for indicating that said Correlation Identifier is currently in use or is free,
    a Task/process Identifier for identifying an active task or process in the Intelligent Network application module, and
    a Mobile Party Identifier for identifying a Mobile Terminal.

2. The Intelligent Network Control Node as claimed in claim 1, having
  a Relay Layer Controller, an input configured Link Layer Controller and an output configured Link Layer Controller for executing the link and relay layer protocol for sending and receiving the Short Message Service messages via the data interfaces.

3. The Intelligent Network Control Node as claimed in claim 1, where the application interface is adapted for exchanging control messages for controlling the exchange of Short Message Service messages.

4. The Intelligent Network Control Node as claimed in claim 1, where said data interface is compliant with 3GPP MAP protocol.

5. The Intelligent Network Control Node as claimed in claim 1, being one of the group comprising
  Service Capability Server, a combination of a Service Capability Server, an Application Server, a Service Control Point, a combination of a Service Control Point and a Service Data Point, any node performing a Service Control Function, and any combination of nodes performing a Service Control Function.

6. A method for transferring a Short Message Service message, comprising a header and a body, from a Mobile Terminal via Mobile Network Switching Node, control interfaces and data interface, Intelligent Network Control Node, and application interface to an Intelligent Network application module the method comprising the steps of:
  transmitting of the Short Message Service (SMS) message by the terminal to a Mobile Network Switching Node, checking the Short Message Service (SMS) message for possible invocation of an Intelligent Network Service by the Mobile Network Switching Node, forwarding the header by the Mobile Network Switching Node via a control interface to the Intelligent Network Control Node, forwarding the header from the Intelligent Network Control Node via an application interface to the application module, analyzing and adjusting the header by the application module, sending the header back to the Intelligent Network Control Node by the application module via the application interface, forwarding the header by the Intelligent Network Control Node via the control interface to the Mobile Network Switching Node, updating the Short Message Service message with the header received, by the Mobile Network Switching Node, forwarding the Short Message Service message by the Mobile Network Switching Node via a data interface to the Intelligent Network Control Node, forwarding the Short Message Service message by the Intelligent Network Control Node via the application interface to the application module.

7. The method as claimed in claim 6, further comprising the following steps of:

checking the header if a Calling Party Identifier in the header matches any Mobile Party Identifier in a Correlation Identifier Table and retrieving, when a match is found, a Task/process Identifier for the application, by the Intelligent Network Control Node, starting, when no match is found, the application based on the Short Message Service message header by the Intelligent Network Control Node, and adding a flag to the header for indicating if to receive the Short Message Service message and adding a Correlation Identifier Number indicating that the Short Message Service message belongs to a Short Message Service dialogue, by the application module, checking by the Intelligent Network Control Node if the flag is set and if not continue, checking if the Correlation Identifier Number is present and if not, getting a Correlation Identifier Number indicated by Pointer and storing the Mobile Party Identifier of the terminal and the Task/process Identifier of the application, in the table, by the Intelligent Network Control Node, modifying the header by replacing the Called Party Identifier with the Correlation Identifier Number, and a Message Centre Identifier with an the Intelligent Network Control Node identifier, and retrieving by the Intelligent Network Control Node the Correlation Identifier Number from the header and getting the Task/process Identifier of the application module, from the table, as indicated by the Correlation Identifier Number.

8. A method for transferring a Short Message Service message from an Intelligent Network application module via application interface, Intelligent Network Control Node control interfaces and data interface, and Mobile Network Switching Node to a Mobile Terminal, the method comprising the steps of:

transmitting the Short Message Service message by the application to an Intelligent Network Control Node via an application interface, forwarding the Short Message Service message by the Intelligent Network Control Node via a data interface to a Mobile Network Switching Node, forwarding the Short Message Service message by the Mobile Network Switching Node to the terminal, and correlating said transferring of said Short Message Service messages through said data interface with destination control data exchanged through said control interface using correlation means, sending a Request CI message by the application module via the application interface to the Intelligent Network Control Node by the application module for initiating a Short Message Service dialogue with the terminal, getting a Correlation Identifier Number indicated by Pointer and returning the Correlation Identifier Number by the Intelligent Network Control Node via the application interface to the application module, storing, by the Intelligent Network Control Node, a Mobile Party Identifier of the terminal and a Task/process Identifier of the application, in a Correlation Identifier Table on a position pointed to by the Correlation Identifier Number in the Short Message Service message, re-forwarding the Short Message Service message by the Intelligent Network Control Node to a Message Server in the event that the Mobile Network Switching Node replies that the Short Message Service message is not deliverable, forwarding the Short Message Service message by the server to a Mobile Network Switching Node, sending an End correlation message by the application module via the application interface to the Intelligent Network Control Node for ending the Short Message Service dialogue with the terminal, stopping correlation by the Intelligent Network Control node in setting a FREE/BUSY flag to "FREE" in the table pointed to by the Correlation Identifier Number in the End correlation message, and returning the End correlation message by the Intelligent Control Node via the application interface to the application module.

* * * * *

UNITED STATES PATENT AND TRADEMARK OFFICE
CERTIFICATE OF CORRECTION

PATENT NO. : 7,865,199 B2  
APPLICATION NO. : 11/722866  
DATED : January 4, 2011  
INVENTOR(S) : Noldus Page 1 of 1

It is certified that error appears in the above-identified patent and that said Letters Patent is hereby corrected as shown below:

In Column 4, Line 15, delete "invention," and insert -- invention. --, therefor.

In Column 12, Line 34, delete "DELETE ID" and insert -- DELETE+ID --, therefor.

In Column 16, Line 12, in Claim 1, delete "layer" and insert -- Layer --, therefor.

In Column 16, Line 54, in Claim 5, delete "Service" and insert -- a Service --, therefor.

In Column 17, Line 52, in Claim 7, delete "an the" and insert -- the --, therefor.

In Column 18, Line 22, in Claim 8, delete "Request CI" and insert -- Request_CI --, therefor.

In Column 18, Line 43, in Claim 8, delete "End correlation" and insert -- End_correlation --, therefor.

In Column 18, Line 50, in Claim 8, delete "End correlation" and insert -- End_correlation --, therefor.

In Column 18, Line 51, in Claim 8, delete "End correlation" and insert -- End_correlation --, therefor.

Signed and Sealed this  
Thirty-first Day of May, 2011

David J. Kappos  
*Director of the United States Patent and Trademark Office*